US012116264B2

(12) United States Patent
Liao

(10) Patent No.: US 12,116,264 B2
(45) Date of Patent: Oct. 15, 2024

(54) FLUID FILLING DEVICE

(71) Applicant: LIH YANN INDUSTRIAL CO., LTD., Taichung (TW)

(72) Inventor: Po-Lin Liao, Taichung (TW)

(73) Assignee: LIH YANN INDUSTRIAL CO., LTD., Taichung (TW)

( * ) Notice: Subject to any disclaimer, the term of this patent is extended or adjusted under 35 U.S.C. 154(b) by 297 days.

(21) Appl. No.: 17/723,151

(22) Filed: Apr. 18, 2022

(65) Prior Publication Data

US 2023/0331542 A1 Oct. 19, 2023

(51) Int. Cl.
*B67D 7/42* (2010.01)

(52) U.S. Cl.
CPC ............... *B67D 7/42* (2013.01); *B67D 7/426* (2013.01)

(58) Field of Classification Search
CPC .. B67D 1/0829; B67D 1/0831; B67D 1/0835; B67D 1/0848; Y10T 137/314
See application file for complete search history.

(56) References Cited

U.S. PATENT DOCUMENTS 3,065,885 A * 11/1962 Chatten ................ B67D 1/0832 137/212
3,231,154 A * 1/1966 Johnston .............. B67D 1/0832 222/400.7
3,464,435 A * 9/1969 Lamb ................... B67D 1/0832 137/320
4,089,444 A * 5/1978 Shea .................... B67D 1/0831 137/212
5,356,045 A * 10/1994 Parks ................... B67D 1/0829 222/400.7
8,757,195 B2 * 6/2014 Gitlin, Jr. ............. B67D 1/0831 222/400.7
2009/0020176 A1 * 1/2009 Hasegawa ............ B67D 7/0261 222/105
2015/0266713 A1 * 9/2015 Peirsman ............. B67D 1/0406 222/394

* cited by examiner

*Primary Examiner* — Timothy P. Kelly
(74) *Attorney, Agent, or Firm* — MUNCY, GEISSLER, OLDS & LOWE, P.C.

(57) ABSTRACT

A fluid filling device is provided, including: a covering unit, a quick-connecting unit and a base. The covering unit is configured to cover an opening portion. The covering unit includes a first flow channel, and the first flow channel is configured to be communicated with an interior of the opening portion. The quick-connecting unit is disposed on the covering unit and communicated with the first flow channel. The base includes at least one joint, a second flow channel and a connection portion. The at least one joint is configured to be assembled with at least one pipe. The second flow channel is communicated respectively with the at least one joint and the connection portion. The connection portion is detachably and communicatedly connected with the quick-connecting unit.

9 Claims, 6 Drawing Sheets

FLUID FILLING DEVICE

BACKGROUND OF THE INVENTION

Field of the Invention

The present invention relates to a fluid filling device.

Description of the Prior Art

Generally, liquid filling is carried out by directly pouring, using a funnel or pipes. However, during operation, the liquid is easy to leak out, and air is brought into the container with the liquid so that the gas in the container is squeezed out and the container cannot to be filled to the full. In addition, the funnel, the pipes or other assistive devices are not engaged with the container, which is unstable and inconvenient for liquid filling.

The present invention is, therefore, arisen to obviate or at least mitigate the above-mentioned disadvantages.

SUMMARY OF THE INVENTION

The main object of the present invention is to provide a fluid filling device, including a covering unit and a base which are detachably assembled with each other via a quick-connecting unit. Therefore, steps of assembling the covering unit with an opening portion of a container and assembling the base with pipes can be operated respectively. In addition, the base is assembled with the quick-connecting unit on the covering unit by linear movement, which avoids interference of the pipes and provides rapid and easy operation.

To achieve the above and other objects, the present invention provides a fluid filling device, including: a covering unit, a quick-connecting member and a base. The covering unit is configured to cover an opening portion. The covering unit includes a first flow channel, and the first flow channel is configured to be communicated with an interior of the opening portion. The quick-connecting member is tubular, and the quick-connecting member is disposed on the covering unit and communicated with the first flow channel. The base includes at least one joint, a second flow channel and a connection portion. The at least one joint is configured to be assembled with at least one pipe. The second flow channel is communicated respectively with the at least one joint and the connection portion. The connection portion is detachably and communicatedly connected with the quick-connecting member.

The present invention will become more obvious from the following description when taken in connection with the accompanying drawings, which show, for purpose of illustrations only, the preferred embodiment(s) in accordance with the present invention.

DETAILED DESCRIPTION OF THE PREFERRED EMBODIMENTS

Figure 1:
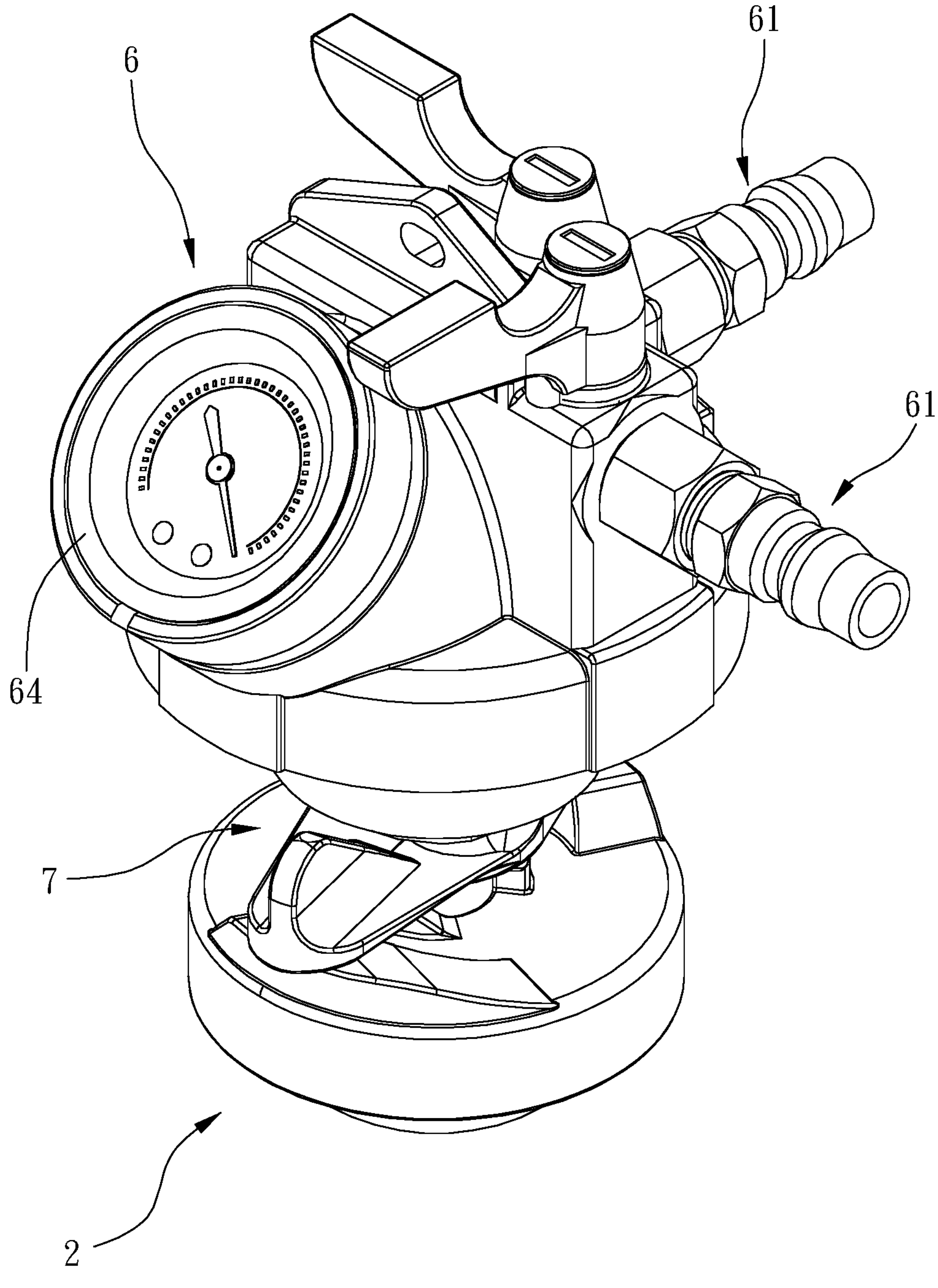
FIG. 1 is a stereogram of a preferable embodiment of the present invention.
Figure 2:
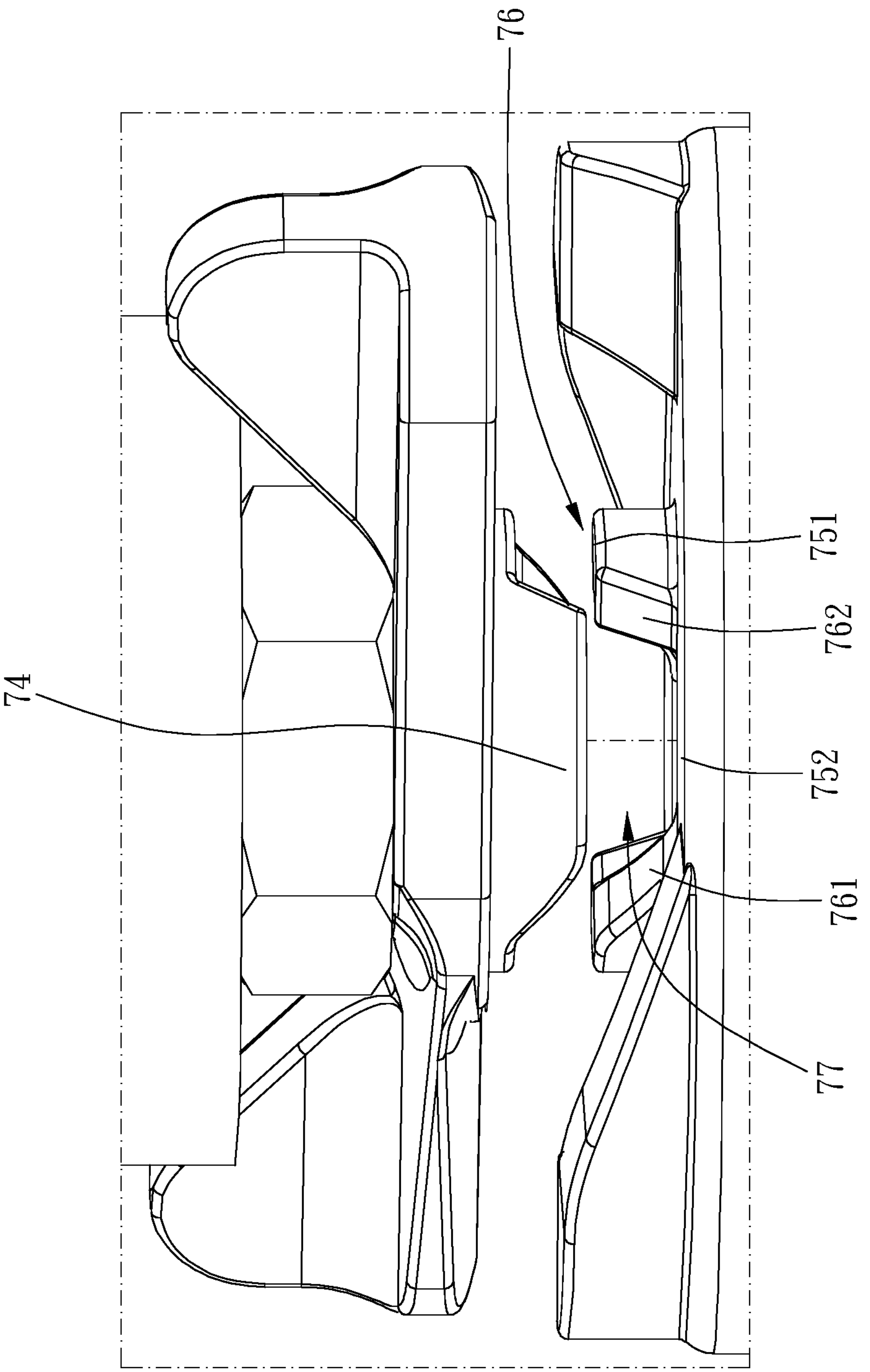
FIG. 2 is a schematic diagram showing a stepped structure and an urged portion according to a preferable embodiment of the present invention.
Figure 3:
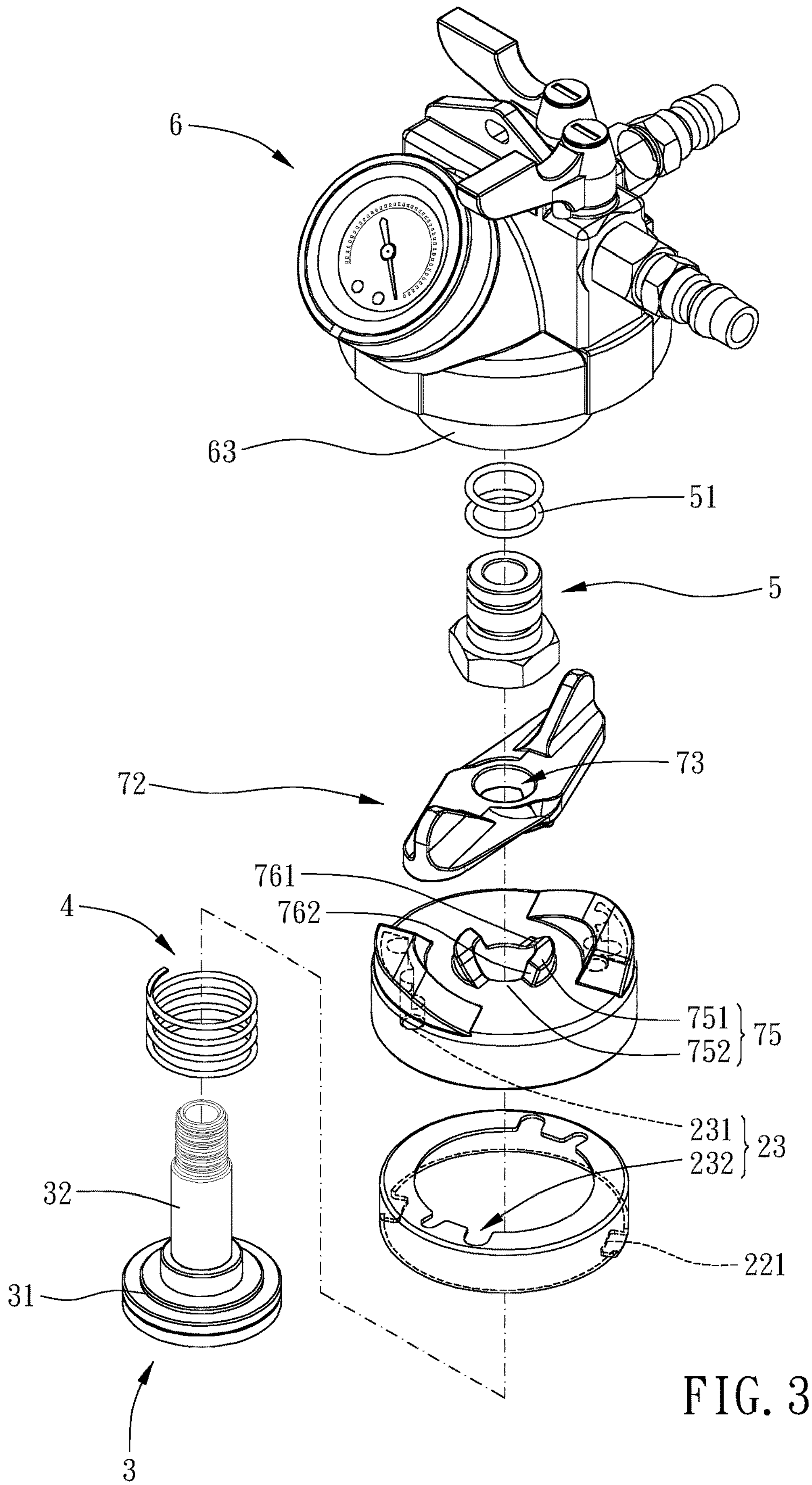
FIG. 3 is a breakdown drawing of a preferable embodiment of the present invention.
Figure 4:
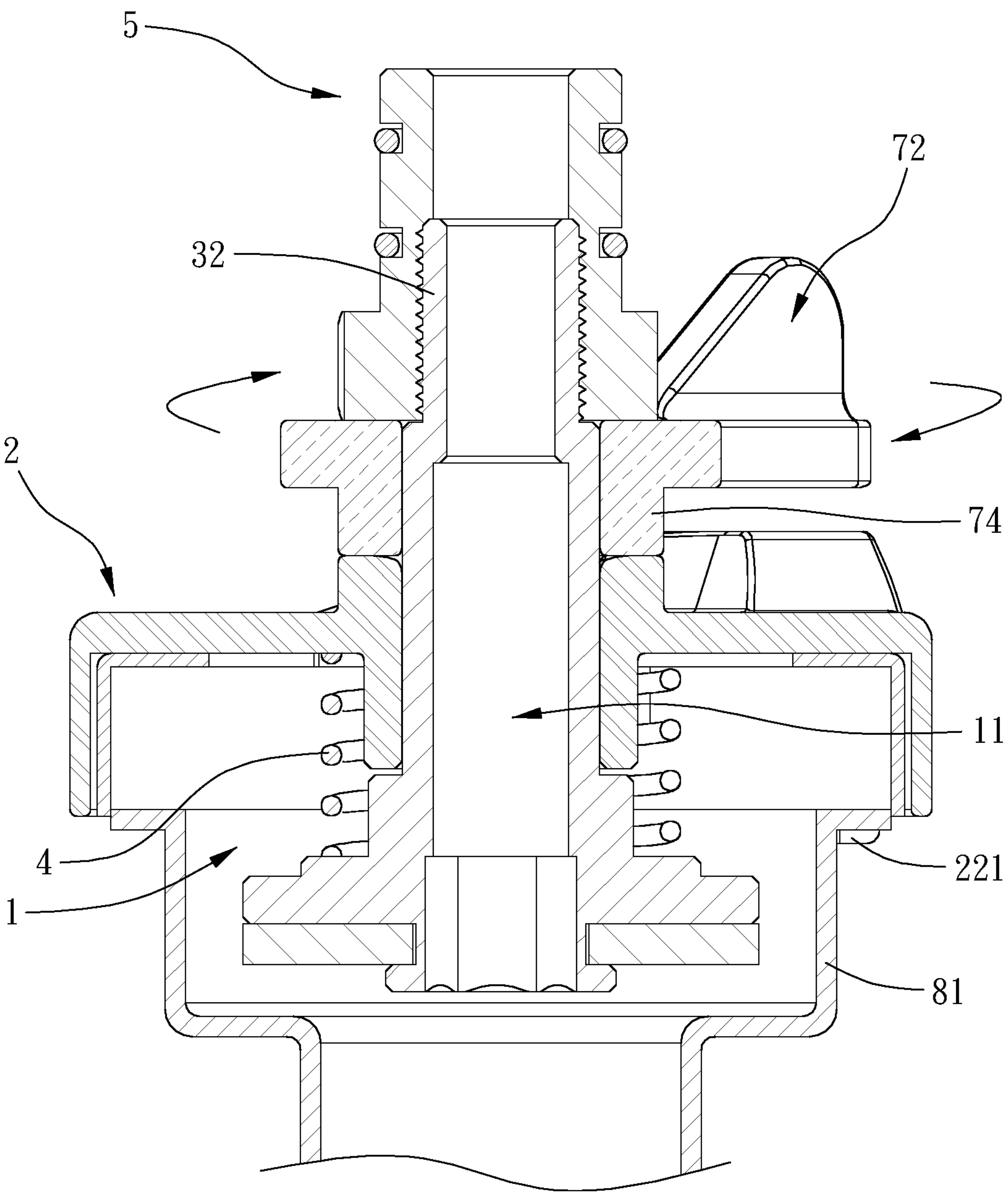
FIGS. 4-6 are schematic diagrams showing assembling steps according to a preferable embodiment of the present invention.

Please refer to FIGS. 1 to 6 for a preferable embodiment of the present invention. A fluid filling device of the present invention includes a covering unit 1, a quick-connecting member 5 and a base 6.

The covering unit 1 is configured to cover an opening portion 81. The covering unit 1 includes a first flow channel 11, and the first flow channel 11 is configured to be communicated with an interior of the opening portion 81. The quick-connecting member 5 is tubular, and the quick-connecting member 5 is disposed on the covering unit 1 and communicated with the first flow channel 11. The base 6 includes at least one joint 61, a second flow channel 62 and a connection portion 63, and the at least one joint 61 is configured to be assembled with at least one pipe 82. The second flow channel 62 is communicated respectively with the at least one joint 61 and the connection portion 63, and the connection portion 63 is detachably and communicatedly connected with the quick-connecting member 5.

The covering unit 1 is detachably assembled with the base 6 via the quick-connecting member 5 so that steps of assembling the covering unit 1 with the opening portion 81 and assembling the base 6 with the at least one pipe 82 can be operated respectively. Parts of the fluid filling device can be taken and operated individually, which is convenient to assemble. Moreover, the base 6 connected with the at least one pipe 82 is moved linearly to be connected with the quick-connecting member 5, which effectively prevents the at least one pipe 82 to interfere with one another and is easy to operate.

In this embodiment, the base 6 is assembled with a plurality of said pipes 82, one of the plurality of said pipes 82 is connected with a pump to exhaust gas from the opening portion 81, and another one of the plurality of said pipes 82 is connected with a liquid source to supply a liquid. A pressure gauge 64 is disposed on the base 6 so as to measure a pressure value in the opening portion 81 for various requirements.

Preferably, the quick-connecting member 5 is detachably disposed on the covering unit 1. In other words, the fluid filling device is formed by three individual parts, namely the covering unit 1, the quick-connecting member 5 and the base 6, which is convenient to be disassembled to storage and allows replacement of any one of the parts. In this embodiment, the quick-connecting member 5 is screwed with the covering unit 1, and the quick-connecting member 5 is detachably and insertedly connected with the connection portion 63.

A plurality of sealing members 51 are sleeved to an outer periphery wall of the quick-connecting member 5. When the quick-connecting member 5 is insertedly connected with the connection portion 63, the plurality of sealing members 51 are abutted against and between the outer periphery wall of the quick-connecting member 5 and an inner periphery wall of the connection portion 63 so as to avoid leakage and provide tight connection of the base 6 and the quick-connecting member 5.

Specifically, the covering unit 1 includes a lid body 2, a plug body 3 and an elastic member 4. The plug body 3 includes a plug head 31 and an axial rod 32 connected with each other, and the first flow channel 11 extends through the axial rod 32 and the plug head 31. The elastic member 4 is sleeved to the axial rod 32 and abutted against and between the plug head 31 and the lid body 2 so that the plug head 31 has a tendency to move in a direction away from the lid body 2. Moreover, the lid body 2 includes at least one engaging portion 221, and the at least one engaging portion 221 is configured to be engaged with an outer wall of the opening portion 81. When the opening portion 81 is covered with the lid body 2, the plug head 31 disposed within the opening portion 81 is abutted against a stepped portion of the opening portion 81, and the at least one engaging portion 221 is movable to be stably engaged with the outer wall of the opening portion 81 (such as an inlet of a radiator).

Moreover, the lid body 2 includes a first member 21 and a second member 22, and the first member 21 is detachably sleeved with the second member 22. The elastic member 4 is elastically abutted against and between the plug head 31 and the second member 22, and the second member 22 has the at least one engaging portion 221 disposed thereon. The second member 22 may be formed with different numbers and/or different positions of the at least one engaging portion 221 so as to meet various requirement.

Preferably, a thickness of the first member 21 is larger than a thickness of the second member 22 so as to protect the second member 22 from collision.

The lid body 2 further includes an anti-rotation structure 23, and the anti-rotation structure 23 includes at least one projection 231 and at least one through hole 232. One of the at least one projection 231 and the at least one through hole 232 is disposed on the first member 21, and the other of the at least one projection 231 and the at least one through hole 232 is disposed on the second member 22. When the first member 21 is sleeved with the second member 22, the at least one projection 231 penetrates into the at least one through hole 232 and is blocked with at least one hole wall of the at least one through hole 232 in a circumferential direction of the first member 21, and the first member 21 is co-rotatable with the second member 22.

Furthermore, the fluid filling device further includes a switch mechanism 7, and the switch mechanism 7 includes an abutting portion 71, a rotation member 72 and a stepped structure 75. The abutting portion 71 is protrudingly positioned on the axial rod 32, and the stepped structure 75 is disposed on the lid body 2. The stepped structure 75 includes at least one higher portion 751 and at least one lower portion 752 lower than the at least one higher portion 751 in an axial direction of the axial rod 32. The at least one higher portion 751 is located farther from the lid body 2 than the at least one lower portion 752. The rotation member 72 has a penetrating hole 73 disposed therethrough, and the axial rod 32 is axially and movably disposed through the penetrating hole 73. The rotation member 72 is located between the stepped structure 75 and the abutting portion 71, and the elastic member 4 urges the abutting portion 71 to be abutted against the rotation member 72. At least one urged portion 74 of the rotation member 72 is abutted against the stepped structure 75.

In this embodiment, the abutting portion 71 is disposed on the quick-connecting member 5, and the abutting portion 71 is disposed on an end of the quick-connecting member 5. When the base 6 is connected with the quick-connecting member 5, the abutting portion 71 is abutted against and between the connection portion 63 and the rotation member 72 in the axial direction of the axial rod 32.

Figure 5:
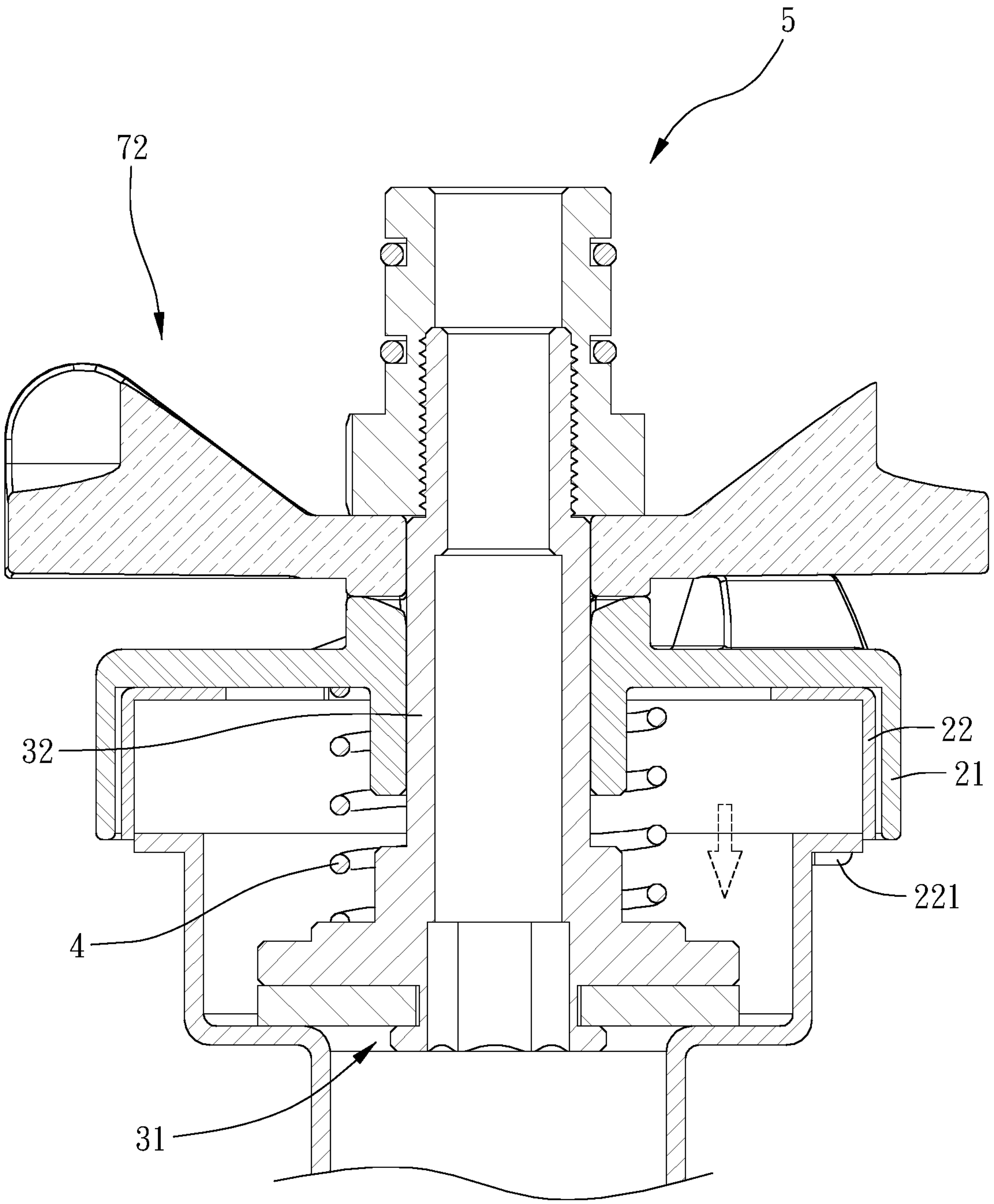
Figure 6:
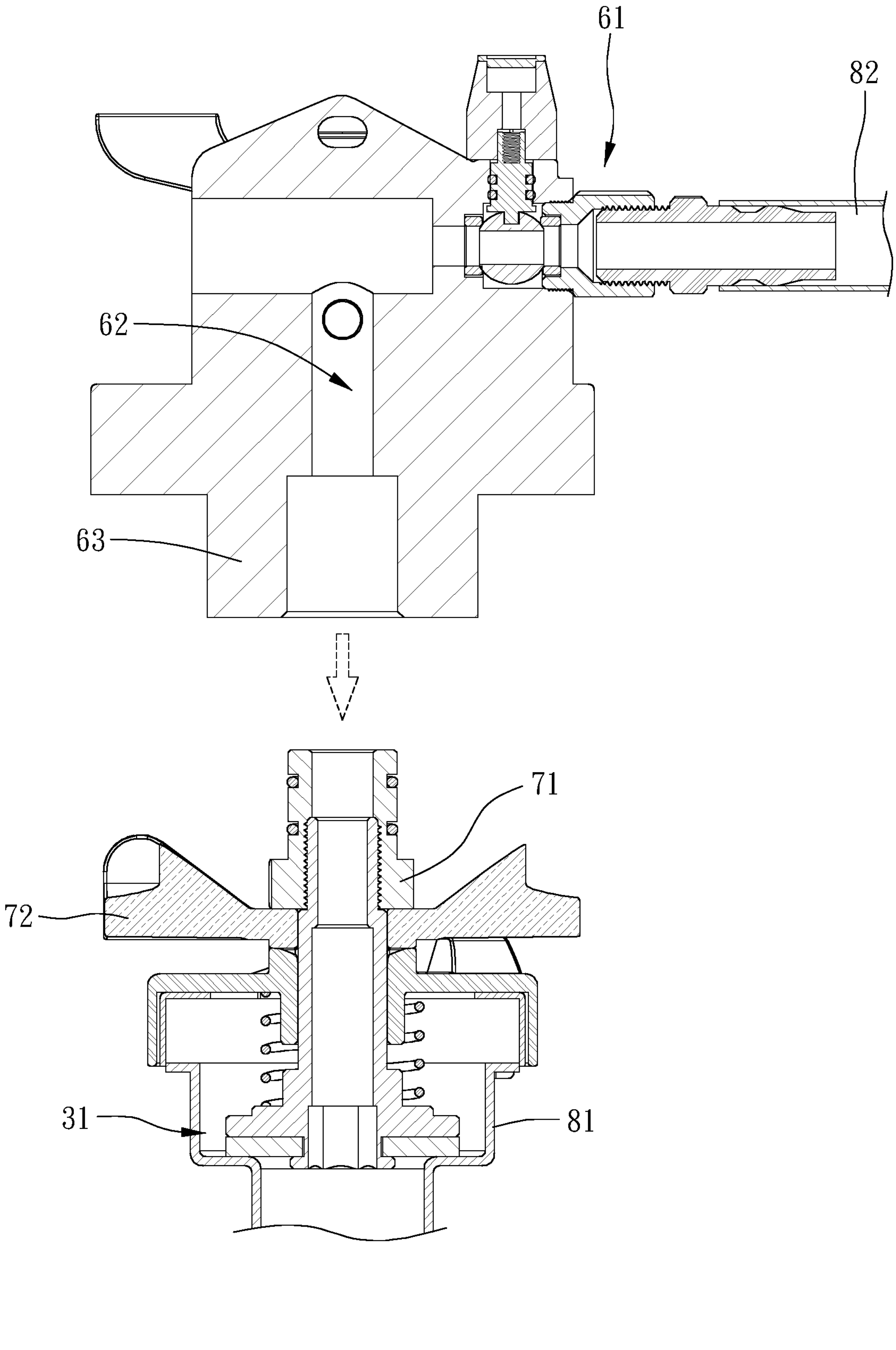

Specifically, when the rotation member 72 is rotated relative to the axial rod 32 and the at least one urged portion 74 is moved toward the at least one higher portion 751, the plug head 31 is moved in a direction toward the lid body 2, and the elastic member 4 is compressed; the plug head 31 is spaced apart from the stepped portion of the opening portion 81, and the at least one engaging portion 221 is not engaged with the outer wall of the opening portion 81, as shown in figured 4. When the rotation member 72 is rotated relative to the axial rod 32 and the at least one urged portion 74 is moved toward the at least one lower portion 752, the plug body 3 is moved in a direction remote from the lid body 2, and the elastic member 4 is stretched; the plug head 31 is abutted against the stepped portion of the opening portion 81, and the at least one engaging portion 221 is engaged with the outer wall of the opening portion 81, as shown in FIG. 5.

Before the covering unit 1 is assembled to the opening portion 81, the rotation member 72 is rotated to move the at least one urged portion 74 to the at least one higher portion 751 (the elastic member 4 is compressed); then the lid body 2 is covered on the opening portion 81 and the plug head 31 is disposed within the interior of the opening portion 81. Next, the rotation member 72 is loosen to allow the at least one urged portion 74 to be located at the at least one lower portion 752 (the elastic member 4 is stretched) so that the covering unit 1 is tightly positioned on the opening portion 81 via an elastic force of the elastic member 4.

In this embodiment, a number of the at least one urged portion 74 is two; a number of the at least one higher portion 751 is two; and a number of the at least one lower portion 752 is two. The stepped structure 75 further includes two protruding blocks 76, and the two protruding blocks 76 are spacingly arranged on the lid body 2 around the penetrating hole 73. The two protruding blocks 76 and the lid body 2 define two receiving portions 77. One end of each of the two protruding blocks 76 in a circumferential direction of the penetrating hole 73 has an inclined guide surface 761, another end of each of the two protruding blocks 76 in the circumferential direction has a blocking surface 762 so as to restrict an operational direction of the rotation member 72. A top surface of each of the two protruding blocks 76 in the axial rod 32 is defined as one said higher portion 751, and a bottom surface of each of the two receiving portions 77 is defined as one said lower portion 752.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. A fluid filling device, including:

a covering unit, configured to cover an opening portion, including a first flow channel, the first flow channel configured to be communicated with an interior of the opening portion;

a quick-connecting member, being tubular, disposed on the covering unit and communicated with the first flow channel; and a base, including at least one joint, a second flow channel and a connection portion, the at least one joint configured to be assembled with at least one pipe, the second flow channel being communicated respectively with the at least one joint and the connection portion, the connection portion detachably and communicatedly connected with the quick-connecting member;

wherein the covering unit further includes a lid body, a plug body and an elastic member, the plug body includes a plug head and an axial rod connected with each other, the first flow channel extends through the axial rod and the plug head, and the elastic member is sleeved to the axial rod and abutted against and between the plug head and the lid body so that the plug head has a tendency to move in a direction away from the lid body.

2. The fluid filling device of claim 1, wherein the quick-connecting member is detachably disposed on the covering unit.

3. The fluid filling device of claim 1, wherein the lid body includes at least one engaging portion, and the at least one engaging portion is configured to be engaged with an outer wall of the opening portion.

4. The fluid filling device of claim 3, wherein the lid body includes a first member and a second member, the first member is detachably sleeved with the second member, the elastic member is elastically abutted against and between the plug head and the second member, and the second member has the at least one engaging portion disposed thereon.

5. The fluid filling device of claim 4, wherein the lid body further includes an anti-rotation structure, the anti-rotation structure includes at least one projection and at least one through hole, one of the at least one projection and the at least one through hole is disposed on the first member, the other of the at least one projection and the at least one through hole is disposed on the second member, when the first member is sleeved with the second member, the at least one projection penetrates into the at least one through hole and is blocked with at least one hole wall of the at least one through hole in a circumferential direction of the first member, and the first member is co-rotatable with the second member.

6. The fluid filling device of claim 1, further including a switch mechanism, wherein the switch mechanism includes an abutting portion, a rotation member and a stepped structure, the abutting portion is protrudingly positioned on the axial rod, the stepped structure is disposed on the lid body, the stepped structure includes at least one higher portion and at least one lower portion lower than the at least one higher portion in an axial direction of the axial rod, the at least one higher portion is located farther from the lid body than the at least one lower portion, the rotation member has a penetrating hole disposed therethrough, the axial rod is axially and movably disposed through the penetrating hole, the rotation member is located between the stepped structure and the abutting portion, the elastic member urges the abutting portion to be abutted against the rotation member, at least one urged portion of the rotation member is abutted against the stepped structure; when the rotation member is rotated relative to the axial rod and the at least one urged portion is moved toward the at least one higher portion, the plug head is moved in a direction toward the lid body, and the elastic member is compressed; when the rotation member is rotated relative to the axial rod and the at least one urged portion is moved toward the at least one lower portion, the plug body is moved in a direction remote from the lid body, and the elastic member is stretched.

7. The fluid filling device of claim 6, wherein the abutting portion is disposed on the quick-connecting member.

8. The fluid filling device of claim 1, wherein the quick-connecting member is screwed with the covering unit, and the quick-connecting member is detachably and insertedly connected with the connection portion.

9. The fluid filling device of claim 7, wherein the quick-connecting member is detachably disposed on the covering unit, the lid body includes at least one engaging portion, and the at least one engaging portion is configured to be engaged with an outer wall of the opening portion; the lid body includes a first member and a second member, the first member is detachably sleeved with the second member, the elastic member is elastically abutted against and between the plug head and the second member, the second member has the at least one engaging portion disposed thereon; the lid body further includes an anti-rotation structure, the anti-rotation structure includes at least one projection and at least one through hole, one of the at least one projection and the at least one through hole is disposed on the first member, and the other of the at least one projection and the at least one through hole is disposed on the second member; when the first member is sleeved with the second member, the at least one projection penetrates into the at least one through hole and is blocked with at least one hole wall of the at least one through hole in a circumferential direction of the first member, and the first member is co-rotatable with the second member; the quick-connecting member is screwed with the covering unit, and the quick-connecting member is detachably and insertedly connected with the connection portion; a plurality of sealing members are sleeved to an outer periphery wall of the quick-connecting member, and the plurality of sealing members are abutted against and between the outer periphery wall of the quick-connecting member and an inner periphery wall of the connection portion when the quick-connecting member is insertedly connected with the connection portion; a pressure gauge is disposed on the base; the abutting portion is disposed on an end of the quick-connecting member; when the base is connected with the quick-connecting member, the abutting portion is abutted against and between the connection portion and the rotation member in the axial direction of the axial rod; a thickness of the first member is larger than a thickness of the second member; a number of the at least one urged portion is two, a number of the at least one higher portion is two, and a number of the at least one lower portion is two; the stepped structure further includes two protruding blocks, the two protruding blocks are spacingly arranged on the lid body around the penetrating hole, the two protruding blocks and the lid body define two receiving portions, one end of each of the two protruding blocks in a circumferential direction of the penetrating hole has an inclined guide surface, and another end of each of the two protruding blocks in the circumferential direction has a blocking surface; and a top surface of each of the two protruding blocks in the axial direction of the axial rod is defined as one said higher portion, a bottom surface of each of the two receiving portions is defined as one said lower portion.

* * * * *